April 23, 1957 — R. H. McCORMACK — 2,790,162
DISC TYPE SLIP DETECTOR AND RECTIFIER
Filed Jan. 20, 1956 — 4 Sheets-Sheet 1
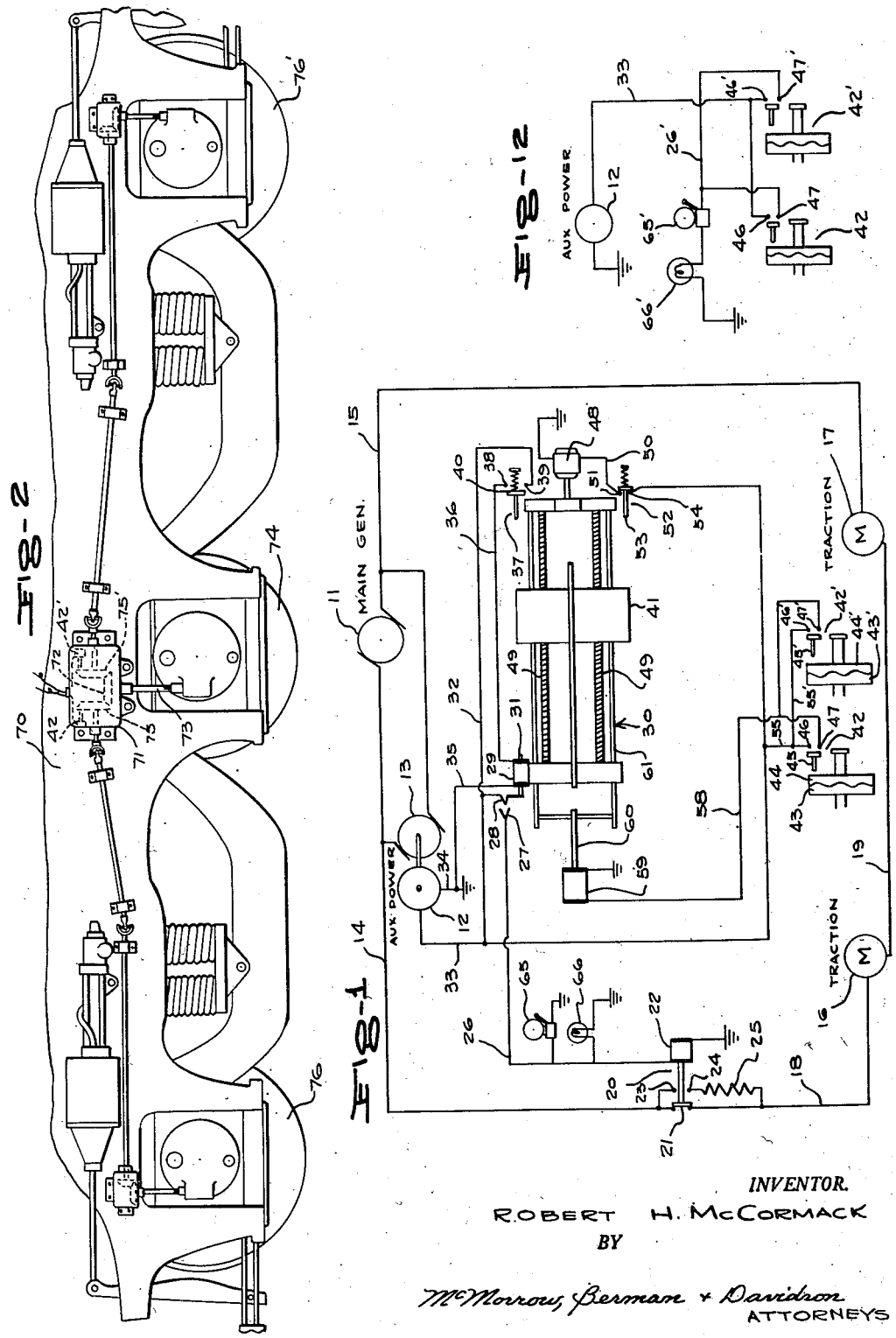
INVENTOR.
ROBERT H. McCORMACK
BY
McMorrow, Berman & Davidson
ATTORNEYS

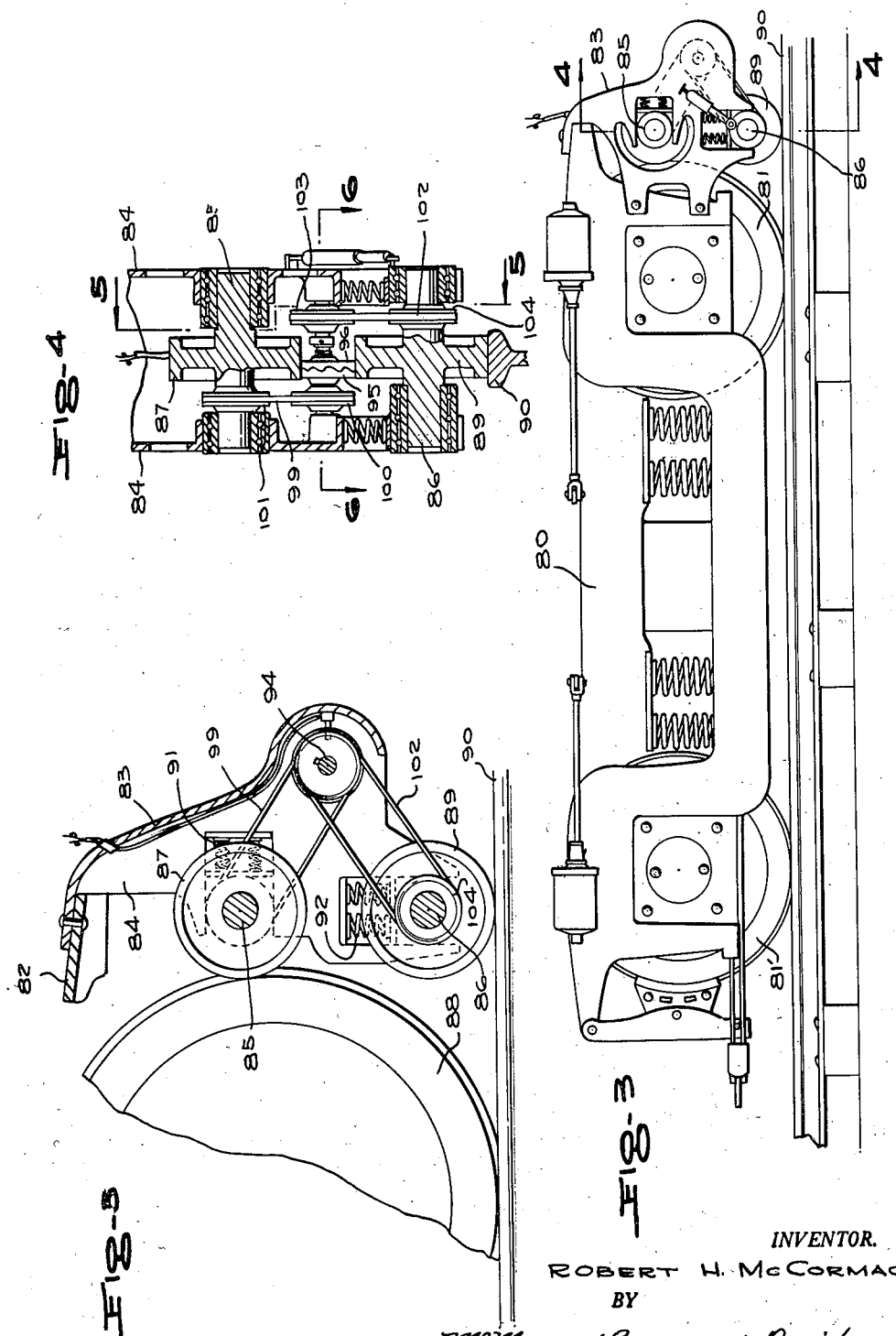

April 23, 1957 R. H. McCORMACK 2,790,162
DISC TYPE SLIP DETECTOR AND RECTIFIER
Filed Jan. 20, 1956 4 Sheets-Sheet 3
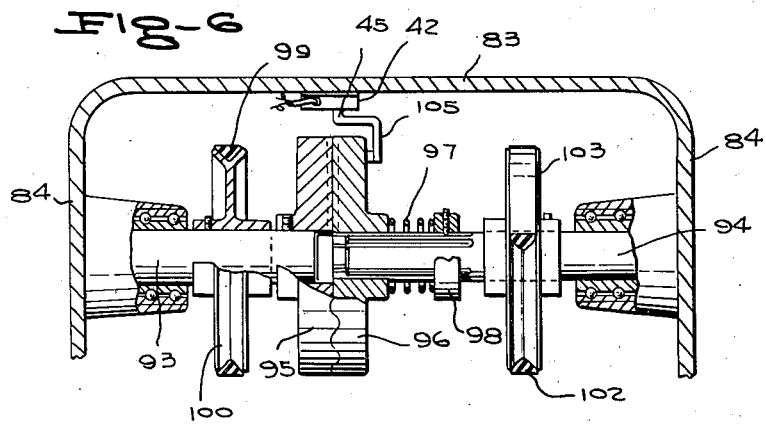
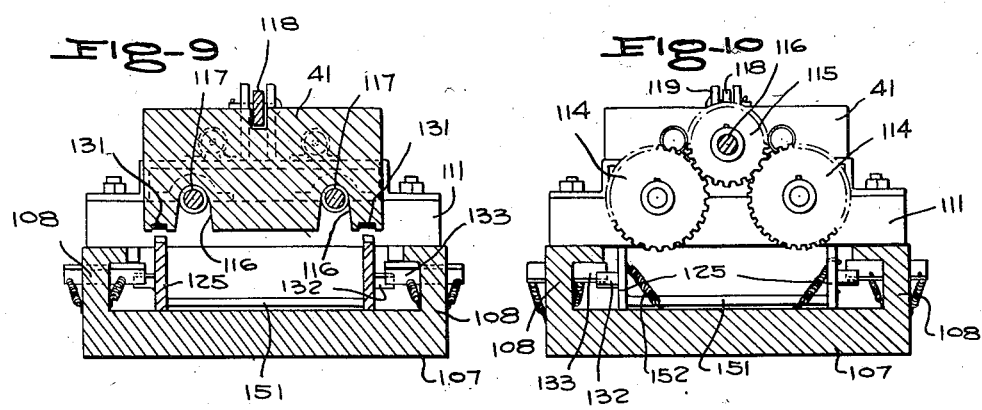
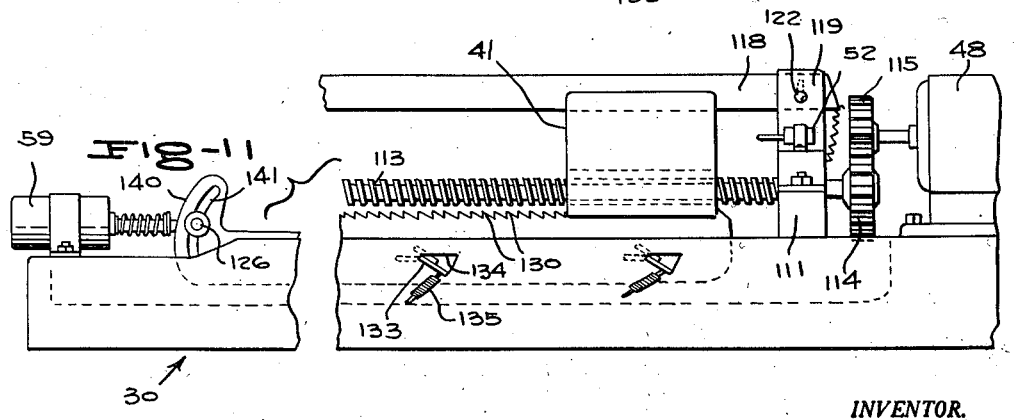
INVENTOR.
ROBERT H. McCORMACK
BY
*McMorrow, Berman + Davidson*
ATTORNEYS

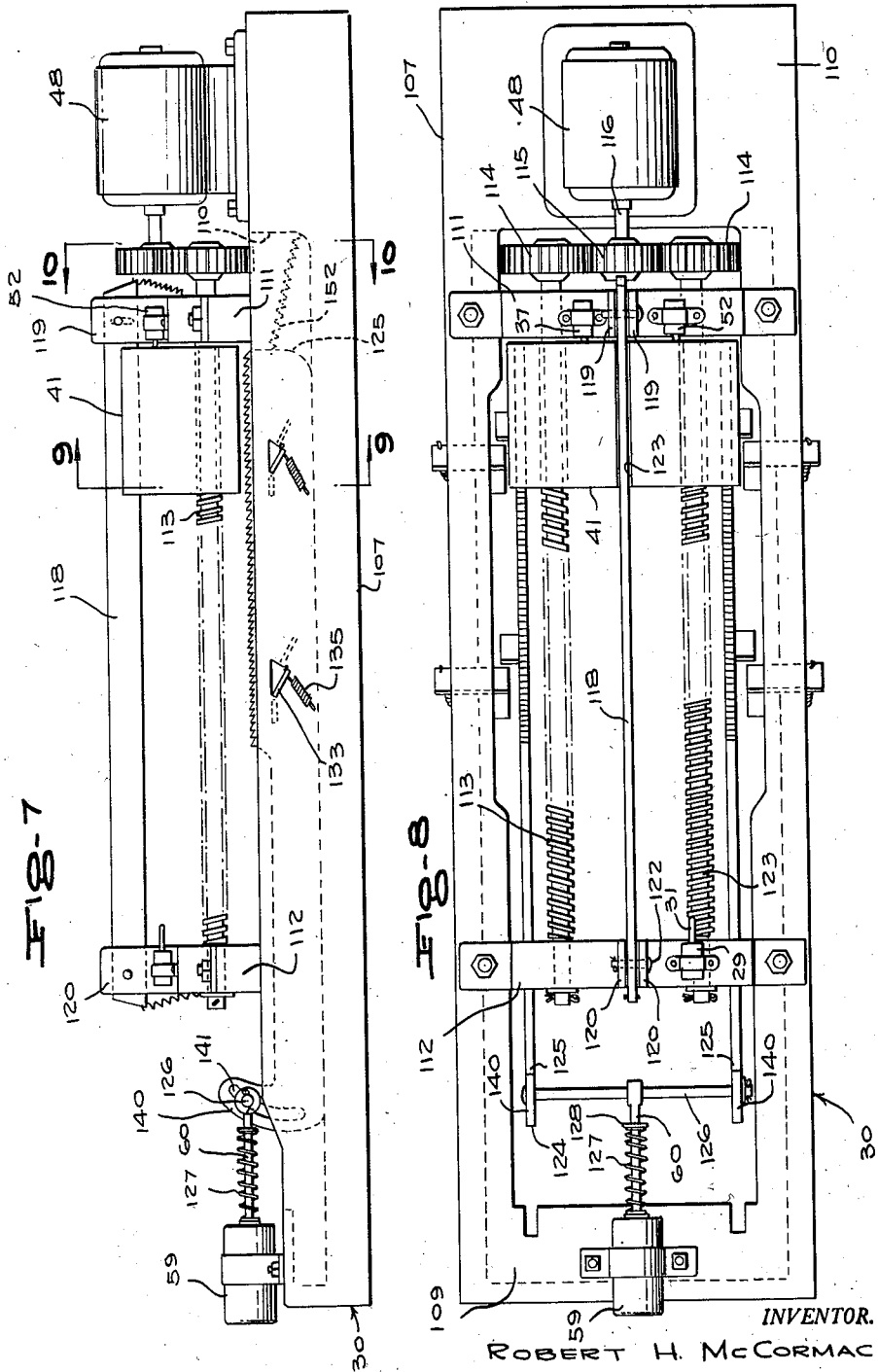

United States Patent Office 2,790,162
Patented Apr. 23, 1957

2,790,162

DISC TYPE SLIP DETECTOR AND RECTIFIER

Robert H. McCormack, Elmhurst, N. Y.

Application January 20, 1956, Serial No. 560,404

9 Claims. (Cl. 340—268)

This invention relates to wheel slip control means for vehicles, and more particularly to a system for use in detecting and rectifying wheel slippage on locomotives and similar vehicles.

A main object of the invention is to provide a novel and improved wheel slip detecting and rectifying device for use on locomotives and similar vehicles, said device involving relatively simple components, being easy to install, and providing a positive reaction to the slippage of a driving wheel of the locomotive or other vehicle on which the device is employed, to provide an indication of such slippage and a corrective action.

A further object of the invention is to provide an improved wheel slip detector and rectifying device for use on locomotives and similar vehicles, said device involving inexpensive components, being durable in construction, being reliable in operation, and being suitable for use on a wide range of vehicles, for example, locomotives of the gas turbine type, electric type, steam type, or diesel type, the device being arranged to function efficiently regardless of the direction of movement of the vehicle on which it is installed.

A still further object of the invention is to provide an improved wheel slip detector and rectifying means for use on locomotives and similar vehicles, said detector and rectifying means operating to provide a positive and reliable indication of wheel slippage of the vehicle on which it is installed and being arranged to automatically initiate the operation of suitable retarding means to correct wheel slippage, or other means, such as sanders or the like which may be thus operated whenever conditions arise producing excessive slippage of the driving wheels of the vehicle.

A still further object of the invention is to provide an improved wheel slip detector and rectifying system for locomotives and similar vehicles, the system involving inexpensive components which are relatively compact in size, relatively light in weight, and relatively rugged in construction, the system operating to provide a reliable indication of excessive wheel slippage conditions of the locomotive or other vehicle on which the apparatus is installed, whereby the operator of the vehicle is notified and may take appropriate action to correct the slippage condition, the apparatus being further adapted to automatically initiate necessary corrective action, as required, whereby damage to rails caused by excessive slippage of the locomotive driving wheels, maintenance costs, and wasted power are minimized.

Further objects and advantages of the invention will become apparent from the following description and claims, and from the accompanying drawings, wherein:

Figure 1 is a schematic electrical wiring diagram of an improved wheel slippage detector and rectifying system constructed in accordance with the present invention.

Figure 2 is a fragmentary side elevational view of a portion of a locomotive provided with one form of wheel slippage detecting and rectifying means according to the present invention.

Figure 3 is a side elevational view of the truck of a locomotive provided with another form of wheel slippage detecting and rectifying apparatus according to this invention.

Figure 4 is an enlarged vertical cross sectional view taken on the line 4—4 of Figure 3.

Figure 5 is a vertical cross sectional view taken on the line 5—5 of Figure 4.

Figure 6 is an enlarged horizontal cross sectional view taken on the line 6—6 of Figure 4.

Figure 7 is a side elevational view of the wheel slip-responsive master delay switch assembly employed in the apparatus of the present invention to delay operation of the indicating and correcting means until slippage of the vehicle driving wheels becomes excessive.

Figure 8 is a top plan view of the master delay switch assembly of Figure 7.

Figure 9 is a transverse vertical cross sectional view taken on the line 9—9 of Figure 7.

Figure 10 is a transverse vertical cross sectional view taken on the line 10—10 of Figure 7.

Figure 11 is a fragmentary side elevational view, similar to Figure 7, but showing the traveling nut member, forming part of the delay switch assembly, in an elevated position and in a position wherein it is moved forwardly over its cooperating worm screw by its elevating member, which is responsive to wheel slippage.

Figure 12 is a schematic wiring diagram of a simplified wheel slippage indicating circuit which may be employed in the apparatus of the present invention.

Referring to the drawings, and more particularly to Figure 1, 11 designates the main generator of a railway vehicle, such as a locomotive, and 12 designates an auxiliary generator which is driven by a motor 13 connected to the main power lines 14 and 15 which are connected to the terminals of the main generator 11. Designated at 16 and 17 are respective traction motors which are drivingly coupled to the driving wheels of the locomotive, the motors being connected to the main generator 11, for example, being connected in series therewith, as by the wires 18 and 19, as shown. The wire 18 is normally connected to the line wire 14 through the contacts of a normally closed relay switch 20 having a relay armature 21 normally engaging respective stationary contacts connected to wires 14 and 18, the armature 21 being retracted when the winding 22 of the relay 20 is energized and thereafter engaging contacts 23 and 24. A retarding resistance 25 is connected between the contact 24 and the wire 18, and the contact 23 is connected to the line wire 14, whereby the retarding resistance 25 is placed in series with the traction motors 16 and 17 when the winding 22 of the relay 20 is energized.

As shown, one terminal of the winding 22 is connected to ground and the other terminal is connected to a wire 26. The wire 26 is connected to a stationary contact 27 which is engageable by the movable contact 28 of a limit switch device 29 which is mounted on and is operatively associated with a master delay switch assembly 30 carried on the locomotive. The movable contact 28 is rigidly secured on the plunger 31 of the limit switch device 29, said plunger 31 being movable axially in the device 29 to allow the contact element 28 to at times engage with the stationary contact 27, in a manner presently to be described.

The movable contact 28 is electrically connected in any suitable manner, as by a suitable flexible conductor to a wire 32. Wire 32 is in turn connected to the auxiliary power line wire 33, said line wire 33 being connected to one terminal of the auxiliary generator 12. The other terminal of the generator 12 is connected to ground, as by a wire 34.

The limit switch device 29 has a winding which, when energized, is effective to move the plunger 31 away from the stationary contact 27 and disconnect the contact element 28 from said contact 27. One terminal of the winding of the device 29 is connected to ground, as by a wire 35. The other terminal of the winding of the switch device 29 is connected to a wire 36.

As shown diagrammaticaly in Figure 1, the limit switch device 29 is mounted at one end of the master delay switch assembly 30, for example, at its left end. Mounted at the other end of the assembly 30 is another limit switch 37 of the plunger type, said switch 37 comprising the stationary contacts 38 and 39 which are engageable by the enlarged conductive head portion 40 of the plunger of the limit switch 37 to bridge the contacts 38 and 39. The plunger head 40 engages the contacts 38 and 39 responsive to the movement of a traveling nut member 41, presently to be described, to its rearmost position on the frame of the assembly 30, as will be presently described, whereby the nut member 41 engages the plunger member of the switch 37, closing the contacts 38 and 39. As shown, the wire 32 is connected to the contact 39 and the wire 36 is connected to the contact 38. Therefore, movement of the nut member 41 to its rearmost position energizes the winding of the switch device 29, disconnecting contact 28 from stationary contact 27. However, should the nut member 41 travel in a forward direction to a position adjacent the forward end of the frame of the delay switch assembly 30, the nut member 41 engages the plunger 31 and causes contact element 28 to conductively engage the stationary contact 27, thereby connecting the relay winding 22 to the auxiliary generator 12.

Designated generally at 42 and 42' are a pair of wheel slip-responsive devices which are constructed and arranged so as to close responsive to differences in peripheral speed of driven and idler wheels of the locomotive, in a manner presently to be described, for example, by the cooperation of a pair of disc elements 43 and 44 and 43' and 44', having smoothly curved, intermeshing radial serrations, one disc element being coupled to a driving wheel and the cooperating disc element being coupled to an idler wheel, one disc element being movable axially responsive to a difference in peripheral speed between the associated driving wheel and idler wheel, such movement being produced by the camming cooperation of the smoothly curved radial serrations on the disc members, as will be presently described. Thus, the disc member 44 shown diagrammatically in Figure 1 is movable to engage the plunger element 45 of the associated switch device 42, to cause the plunger element 45 to electrically bridge contacts 46 and 47 of switch device 42. Similarly, the plunger element 45' of the switch device 42' is movable to bridge contacts 46' and 47' of the switch device 42' responsive to axial movement of the disc element 44' produced by a difference in peripheral speed of the respective driving and idler wheels associated with the discs 43' and 44'.

Designated at 48 is a motor which is drivingly coupled to the worm screws 49, 49 of the master delay switch assembly 30, in a manner presently to be described. One termnial of motor 48 is grounded. The other terminal of motor 48 is connected to a wire 50 to one terminal 51 of a limit switch device 52 mounted on the same end of the master relay switch assembly 30 as the limit switch device 37. Thus, the plunger 53 of limit switch device 52 is engageable by the nut member 41 when the nut member 41 reaches its rearmost position on the assembly 30. Under conditions of wheel slippage, the plunger element 53 of the switch device 52 bridges the contacts 51 and 54 of the switch device 52, the contacts being opened by the engagement of the nut member 41 with the plunger element 53 when the nut member 41 reaches its rearmost position on the assembly 30, as will be presently described.

As shown, the stationary contact 54 is connected to the auxiliary power line wire 33 so that motor 48 will be energized as long as the nut member 41 is not in its rearmost position, namely, as long as the plunger element 53 of switch device 52 is in its contact-closing position, shown in Figure 1.

The contacts 46 and 46' of the slip-responsive switch devices 42 and 42' are connected to the wire 33, as by respective wires 55 and 55'. Contacts 47 and 47' are connected to a wire 58, which in turn is connected to one terminal of a nut-translating solenoid 59. The remaining terminal of solenoid 59 is connected to ground, as shown.

The solenoid 59 is provided with a plunger 60 which is mechanically connected to a longitudinally movable nut-engaging frame 61, presently to be dsecribed, which operates to move the nut member 41 forwardly by a predetermined amount each time the solenoid 59 is energized responsive to the closure of switches 42 or 42'. The forward movement of the nut member 41 produced by the intermittent energization of the solenoid 49 is balanced against the normal rearward movement of the nut member 41 produced by the rotating worm screws 49. If the closure of the switch devices 42 or 42' occurs above a predetermined rate, namely, if excessive wheel slip is present in connection with the driving wheels of locomotives, the travel of the nut member 41 in a forward direction is sufficient to cause the nut member 41 to engage the plunger element 31, whereby movable contact 28 engages the stationary contact 27. This connects wire 26 to the auxiliary power wire 33 and energizes the retarder relay 22, placing the retarding resistance 25 in the circuit of the traction motors 16 and 17, thereby retarding the driving wheels of the locomotive, to rectify the wheel slippage condition. Also connected in parallel with the retarding relay 22 are suitable signal devices, for example, a signal bell 65 and a signal lamp 66, which may be located in the operator's compartment of the locomotive, to notify the operator of the excessive slippage condition.

Obviously, other devices may be connected in parallel with the devices 22, 66 or 65, such as electrically operated wheel sanders, or similar devices, to rectify the slippage condition or to provide suitable warnings or alarms of such condition.

As shown in Figure 12, the retarding relay device 22 may be omitted, and the slip-responsive switch devices 42 and 42' may be employed merely to operate a warning circuit to which the auxiliary generator 12 is connected responsive to the closure of either of the switch devices 42 or 42', to indicate slippage of a driving wheel of a locomotive with respect to an idler wheel. Thus, in Figure 3, the wire 33 from the auxiliary generator 12 is connected to the contacts 46 and 46', and the contacts 47 and 47' are connected through a wire 26', an alarm bell 65' and a warning lamp 66' to ground, whereby the alarm devices 65' and 66' become energized when either of the slip-responsive switch devices 42 or 42' closes.

In the form of the invention shown in Figure 2, 70 designates a locomotive frame, and mounted on the frame is a gear housing 71 in which is journaled a bevel gear 72 which is coupled by a shaft 73 and appropriate gearing to the axle of an idler wheel 74 of the locomotive. Respective bevel gears 75 and 75' are rotatably and slidably journaled in the housing 71 on axes which are aligned and which are perpendicular to the axis of the bevel gear 72, the bevel gears 75 and 75' meshing with the bevel gear 72. The bevel gears have relatively rounded teeth so that differences in speed between bevel gears 75 and 75' with respect to the bevel gear 72 will cause the bevel gear 75 or 75' to be cammed away from the bevel gear 72, suitable spring means being provided to urge the bevel gears 75 and 75' into meshing engagement with the bevel gear 72.

The bevel gears 75 and 75' are respectively coupled to the locomotive driving wheels 76 and 76' so as to be positively driven by said driving wheels. However, as above stated, the gears 75 and 75' are slidable on their axes so as to be movable away from the bevel gear 72 by the camming cooperation of the rounded gear teeth of said gears when differences in the speed of rotation of gear 75 with respect to gear 72 or of gear 75' with respect to gear 72 occur.

The respective slip-responsive switch devices 42 and 42' are suitably mounted in the housing 71 adjacent the respective movable gears 75 and 75' so that the plunger elements 45 and 45' of the switch devices may be engaged by the gear 75 and 75' to close the switch devices 42 and 42' in the manner above explained whenever there is a difference in the peripheral speed of a driven wheel 76 or 76' and the idler wheel 74.

When there is no convenient idler wheel available on the locomotive, an idler wheel may be provided, in the manner illustrated in Figures 3, 4, 5 and 6. Thus, 80 designates a truck of the locomotive having the driving wheels 81 and 81'. Secured to one end of the frame 82 of truck 80 is a housing 83 having side walls 84 in which are journaled respective transverse horizontal shafts 85 and 86. Mountd on shaft 85 is a driven wheel 87 which contacts the periphery of the locomotive driving wheel 88. Mounted on the shaft 86 is a wheel 89 which is in contact with the rail 90 and thus operates as an idler wheel.

Shaft 85 is biased toward the locomotive driving wheel 88 by suitable spring means, for example, springs 91 acting against the journal bearings for the shaft 85, said journal bearings being slidably mounted in the walls 84 so that the springs 91 continuously hold the wheel 87 in contact with the periphery of the locomotive driving wheel 88. Similarly, the idler wheel 89 is biased into contact with the rail 90 by spring means, such as springs 92 acting downwardly on the journal bearings for shaft 86, said journal bearings being mounted for vertical sliding movement in the walls 84, whereby the springs 92 hold the wheel 89 in frictional contact with the rail 90.

As shown in Figure 6, a pair of auxiliary shafts 93 and 94 are journaled in the respective side walls 84, 84 of housing 83, said shafts being in alignment with each other and being parallel to the shafts 85 and 85. Secured on the end of the shaft element 93 is a disc member 95 having smoothly curved radial serrations. Splined on the shaft 94 is a second disc member 96, also having smoothly curved radial serrations, the radially serrated face of the disc member 96 being biased into interlocking engagement with the radially serrated face of the disc member 95 by a coiled spring 97 surrounding the shaft 94 and acting between disc member 96 and a collar 98 secured on said shaft, as shown in Figure 6.

The radial serrations on the mating faces of disc members 95 and 96 are relatively rounded so that the disc member 96 will be cammed away from the disc member 95 where there is a difference in the speed of rotation between that of shaft 93 and that of shaft 94. Shaft 93 is coupled to shaft 85, as by a flexible belt 99 engaged on respective pulleys 100 and 101 secured on shaft 93 and on shaft 85, whereby disc 95 is driven by the locomotive driving wheel 88. Shaft 94 is coupled to the idler wheel shaft 86, as by a belt 102 engaged on pulleys 103 and 104 provided respectively on shafts 94 and 86. Thus, disc 96 is driven by the idler wheel 89.

As shown in Figure 6, a switch device 42 has a plunger element 45 provided with a depending arm 105 extending rearwardly adjacent the disc member 96, whereby the disc member 96 engages the arm 105 when a difference in rotational speed develops between shafts 93 and 94, closing the switch 42, and providing indicating and corrective action, as above described.

Referring now to Figures 7 to 11, the master retarding switch assembly 30 comprises a base frame 107 which may be generally rectangular in shape, as shown, and which may be rigidly secured to any convenient portion of the locomotive frame. As shown, the base frame 107 has the longitudinal side walls 108 and the respective transverse end wall portions 109 and 110. The motor 48 is mounted on the transverse end wall portion 110, whereas the translating solenoid 59 is mounted on the transverse end wall member 109. A first transverse bearing block 111 is secured on the top edges of the longitudinal walls 108 adjacent the motor 48 and a second transverse bearing block 112 is secured on the top edges of the longitudinal walls 108 adjacent the opposite transverse end wall element 109. Longitudinally journaled in the frame 107 and being rotatably supported in the transverse bearing blocks 111 and 112 are the respective worm screws 113, 113, said worm screws being provided on their ends with gears 114 which mesh with a driving gear 115 provided on the shaft 116 of the motor 48, whereby the worm gears 113 and 113 are simultaneously rotated by the motor 48. The nut member 41 is formed with the bottom parallel grooves 116, 116 engageable over the respective worm screws 113, 113, the top portions of the grooves 116 being provided with spaced thread segments 117, as shown in Figure 9, whereby the nut member 41 is threadedly engaged with the worm screws 113 when said nut member is supported on said worm screws, as shown in Figure 9.

A longitudinal guide bar 118 is movably secured at its ends between the vertical flanges 119, 119 and 120, 120 provided centrally on the top portions of the transverse blocks 111 and 112, the ends of the guide bar 118 being fastened by respective transverse pin members 122 extending through the flanges 120 and 119 and through vertical slots provided in the end portions of the guide bar 118, to allow the guide bar 118 to be elevated at times. The guide bar 118 is received in a groove 123 provided centrally in the top portion of the nut member 41, whereby said nut member 41 is guided longitudinally with respect to the frame 107.

Designated generally at 124 is an elevator frame which comprises the toothed longitudinal bars 125, 125 connected by a transverse rod 126 which is connected at its intermediate portion to the plunger 60 of the elevator solenoid 59. A coiled spring 127 surrounds the plunger 60 bearing between the solenoid casing and a collar 128 on plunger 60, biasing the frame 124 rearwardly, namely, toward the rear end wall element 110 of frame 107.

The bars 125 are provided at their top forward edge portions with the serrations or teeth 130 which are engageable with mating serrations 131 provided in the bottom surfaces of the opposite side portions of the nut member 41, the serrations 131 being formed in respective grooves located over the longitudinal side bar members 125, as shown in Figure 9, whereby the teeth 130 of the bars 125 may be elevated into the grooves and interengage with the teeth 131 responsive to the elevation of said bars 125.

Secured on the bars 125 are the laterally outwardly projecting inclined cam lugs 132 which are cammingly engageable with similarly inclined transversely extending plate members 133 hingedly mounted in the side walls 108 and extending through generally triangular apertures 134 formed in said side walls, the plate members 133 being biased downwardly by coiled springs 135 connecting the plate members to the lower portions of the side walls, as shown in Figures 9 to 11. When the elevator solenoid 59 is energized, the plunger 60 is moved inwardly into the solenoid, pulling the frame 124 to the left, as viewed in Figure 8, and causing the side bars 125, 125 to be cammed upwardly, whereby the teeth 130 interengage with the teeth 131. As the side bars 125 are moved upwardly by the camming cooperation of the lugs 132 with the inclined plate element 133, the nut member 41 is lifted off the worm screws 113, 113 and is moved forwardly over said worm screws, finally descending to resume meshing engagement with the worm screws when the solenoid 59 becomes de-energized. Thus, each time a slip-responsive switch device 42 or 42' closes, in the system of Figure 1, the nut device 41 is elevated and moved forwardly over the worm screws 113, 113, opposing the rearward movement of the nut device provided by the motor 48. Since the members 43 and 44 and 43' and 44' intermittently move apart and together, because of the camming cooperation of their radial, smoothly curved serrations, the solenoid 59 will be intermittently energized, providing a series of strokes of the arms 125, 125, the forward strokes of said arms carrying the nut member 41 forwardly, whereas upon release of the nut member, the rotation of the worm screws 113, 113 will tend to move the nut member 41 rearwardly. If the amount of slip is excessive, the forward movement of the nut member 41 will be greater than the rearward movement thereof provided by the rotating worm screws, and the nut member will ultimately move sufficiently forwardly to engage the plunger 31 of the switch device 29 and to cause the movable contact element 28 to engage the stationary contact 27 thereof, as above described, whereby to energize the retarding solenoid 22 and the alarm devices 65 and 66 in the system of Figure 1. As previously explained, the closure of the contacts 28 and 27 may be employed to energize other devices, such as electrically operated track sanders, or the like, to improve the traction and to rectify the slippage condition.

As shown in Figure 8, the switch device 29 is mounted on the transverse bearing block 112, whereas the respective switch devices 37 and 52 are mounted on the transverse bearing block 111. Thus the plunger 31 of the switch device 29 will be engaged by the nut member 41 when the nut member approaches its forward limit of travel, whereas the plungers of the switch devices 37 and 52 will be engaged by the nut member when said nut member reaches its rearmost position.

As above explained, when the nut member 41 reaches its rearmost position, the switch 52 will be opened, deenergizing the motor 48 and the switch 37 will be closed, energizing the winding of the switch device 29, causing the contact element 28 to disengage from the contact member 27, whereby the retarding relay 22 will be deenergized and whereby the alarm devices 65 and 66 will likewise be deenergized.

As shown in Figures 11 and 7, the elevator bars 125, 125 are formed at their forward ends with the upstanding arcuately slotted lugs 140, the ends of the transverse rod 126 being slidably connected to said lugs 140 through the arcuate slots 141 thereof, allowing the bars 125, 125 to be freely cammed upwardly responsive to the pull exerted on the transverse rod 126 by the plunger rod 60 of solenoid 59.

As shown in Figures 9 and 10, the rearward end portions of the elevator bars 125, 125 are rigidly connected together by a transverse cross bar 151, whereby the elevator bars 125, 125, the cross bar 151 and the forward cross rod 126 define the rectangular frame 124. Said frame is biased rearwardly by respective coiled springs 152 connecting the rear ends of the elevator bars 125, 125 to th rearward transverse end wall member 110, as shown in Figure 7 in dotted view. Thus, when the elevator relay 59 is deenergized, the springs 152, 152 move the elevator bars rearwardly to the positions thereof shown in Figure 7. When the relay 59 is energized, the elevator bars 125 are moved forwardly by the relay plunger rod 60 whereby the lug elements 132 of the elevator rods 125 engage the inclined cam plates 133 causing the elevator bars 125, 125 to rise and engage the teeth 131 on the underside of the nut member 41, as above described.

While certain specific embodiments of an improved vehicle wheel slip detector and rectifying system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a ground-engaging driven wheel, a ground-engaging idler wheel, normally open switch means, means closing said switch means responsive to a difference in peripheral speed of said driven wheel and idler wheel, a worm screw journaled on said vehicle, an electric motor connected to said worm screw, an energizing circuit connected to said motor, a nut member threadedly engaged on said worm screw, an indicating member formed and arranged to be operated by said nut member when said nut member reaches a predetermined forward position on said worm screw, said motor operating to move said nut member rearwardly on the screw, and means intermittently moving said nut member forwardly on said worm screw responsive to closure of said switch means.

2. In a vehicle, a ground-engaging driven wheel, a ground-engaging idler wheel, normally open switch means, means closing said switch means responsive to a difference in peripheral speed of said driven wheel and idler wheel, a worm screw journaled on said vehicle, an electric motor connected to said worm screw, an energizing circuit connected to said motor, a nut member threadedly engaged on said worm screw, an indicating member formed and arranged to be operated by said nut member when said nut member reaches a predetermined forward position on said worm screw, said motor operating to move said nut member rearwardly on the screw, and electrically operated means connected in series with said switch means and being formed and arranged to intermittently move said nut member forwardly on said worm screw responsive to closure of said switch means.

3. In a vehicle, a ground-engaging driven wheel, a ground-engaging idler wheel, normally open switch means, means closing said switch means responsive to a difference in peripheral speed of said driven wheel and idler wheel, a worm screw journaled on said vehicle, an electric motor connected to said worm screw, an energizing circuit connected to said motor, a nut member threadedly engaged on said worm screw, an indicating member formed and arranged to be operated by said nut member when said nut member reaches a predetermined forward position on said worm screw, said motor operating to move said nut member rearwardly on the screw, electrically operated means connected in series with said switch means and being formed and arranged to intermittently move said nut member forwardly over said worm screw responsive to closure of said switch means, and additional switch means connected in series with said motor and being formed and arranged to be opened when said nut member reaches a predetermined rearward position on said worm screw, whereby to deenergize said motor.

4. In a vehicle, a ground-engaging driven wheel, electrical driving means connected to said driven wheel, a ground-engaging idler wheel, normally open switch means, means closing said switch means responsive to a difference in peripheral speed of said driven wheel and idler wheel, a worm screw journaled on said vehicle, an electric motor connected to said worm screw, an energizing circuit connected to said motor, a nut member threadedly engaged on said worm screw, retarding means operatively connected to said driving means and formed and arranged to be activated by said nut member when said nut member reaches a predetermined forward position on said worm screw, said motor operating to move said nut member rearwardly on the screw, and electrically operated means connected in series with said switch means and being formed and arranged to intermittently move said nut member forwardly on said worm screw responsive to closure of said switch means.

5. In a vehicle, a ground-engaging driven wheel, electrical driving means connected to said driven wheel, a ground-engaging idler wheel, normally open switch means, means closing said switch means responsive to a difference in peripheral speed of said driven wheel and idler wheel, a worm screw journaled on said vehicle, an electric motor connected to said worm screw, an energizing circuit connected to said motor, a nut member threadedly engaged on said worm screw, retarding means operatively connected to said driving means and formed and arranged to be activated by said nut member when said nut member reaches a predetermined forward position on said worm screw, said motor operating to move said nut member rearwardly on the screw, electrically operated means connected in series with said switch means and being formed and arranged to intermittently move said nut member forwardly on said worm screw responsive to closure of said switch means, and additional switch means connected in series with said motor and being formed and arranged to be opened when said nut member reaches a predetermined rearward position on said worm screw, whereby to deenergize said motor.

6. In a vehicle, a ground-engaging driven wheel, a ground-engaging idler wheel, normally open switch means, means closing said switch means responsive to a difference in peripheral speeds of said driven and idler wheels, a worm screw journaled on said vehicle, means rotating said worm screw, a nut member threadedly engaging said worm screw and being movable rearwardly thereon by the rotation of said screw, electrically operated means formed and arranged to intermittently transfer said nut member forwardly on said screw responsive to closure of said switch means, and indicator means operated by said nut member when said nut member reaches a predetermined forward position on said screw.

7. In a vehicle, a ground-engaging driven wheel, a ground-engaging idler wheel, normally open switch means, means closing said switch means responsive to a difference in peripheral speeds of said driven and idler wheels, a worm screw journaled on said vehicle, means rotating said worm screw, a nut member threadly engaging said worm screw and being movable rearwardly thereon by the rotation of said screw, electrically operated means formed and arranged to intermittently transfer said nut member forwardly on said screw responsive to closure of said switch means, indicator means operated by said nut member when said nut member reaches a predetermined forward position on said screw, and means terminating rotation of said worm screw when said nut member reaches a predetermined rearward position on said worm screw.

8. In a vehicle, a ground-engaging driven wheel, a ground-engaging idler wheel, normally open switch means, means closing said switch means responsive to a difference in peripheral speeds of said driven and idler wheels, a worm screw journaled on said vehicle, means rotating said worm screw, a nut member threadedly engaging said worm screw and being movable rearwardly thereon by the rotation of said screw, an electrically operated elevator member mounted for reciprocating movement parallel to and toward and away from said worm screw, means actuating said elevator member responsive to closure of said switch means, interengaging means on the elevator member and nut member formed and arranged to intermittently elevate said nut member and move said nut member forwardly on said worm screw, and indicator means operated by said nut member when said nut member reaches a predetermined forward position on said screw.

9. In a vehicle, a ground-engaging driven wheel, a ground-engaging idler wheel, normally open switch means, means closing said switch means responsive to a difference in peripheral speeds of said driven and idler wheels, a worm screw journaled on said vehicle, means rotating said worm screw, a nut member threadedly engaging said worm screw and being movable rearwardly thereon by the rotation of said screw, an electrically operated elevator member mounted for reciprocating movement parallel to and toward and away from said worm screw, means actuating said elevator member responsive to closure of said switch means, interengaging means on the elevator member and nut member formed and arranged to intermittently elevate said nut member and move said nut member forwardly on said worm screw responsive to closure of said switch means, indicator means operated by said nut member when said nut member reaches a predetermined forward position on said screw, and means terminating rotation of said worm screw when said nut member reaches a predetermined rearward position on said worm screw.

References Cited in the file of this patent
UNITED STATES PATENTS

| | | |
|---|---|---|
| 1,761,708 | Cook et al. | June 3, 1930 |
| 2,634,405 | Van Stone et al. | Apr. 7, 1953 |
| 2,701,873 | Bard | Feb. 8, 1955 |